H. H. VAUGHAN.
APPLIANCE FOR LOCOMOTIVE CABS AND TENDERS.
APPLICATION FILED SEPT. 20, 1912.
1,108,816.
Patented Aug. 25, 1914.
2 SHEETS—SHEET 2.
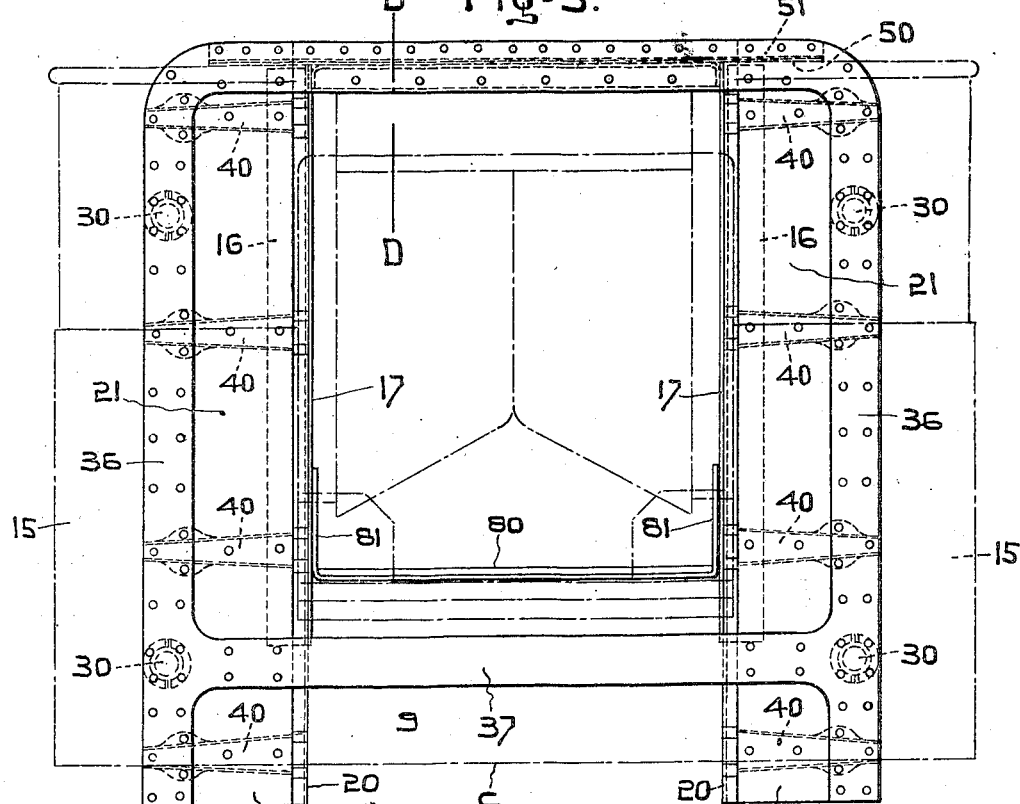
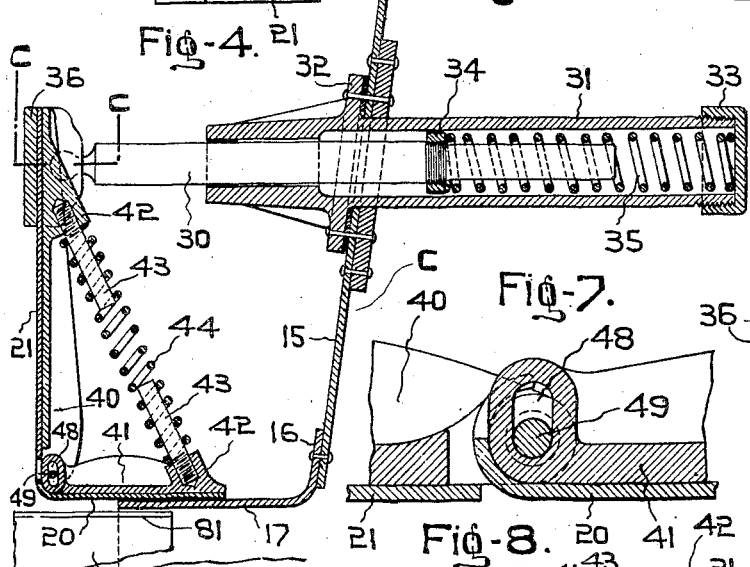
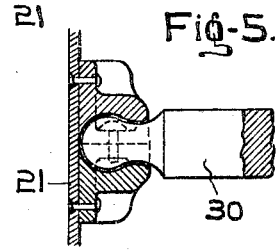
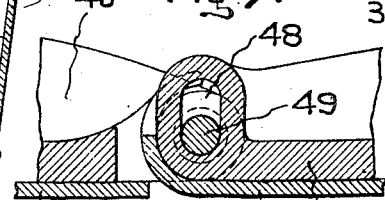
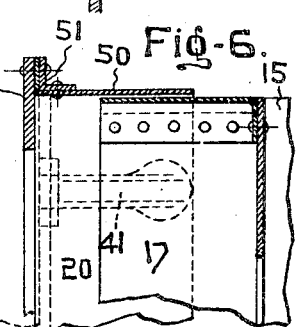
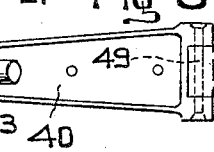

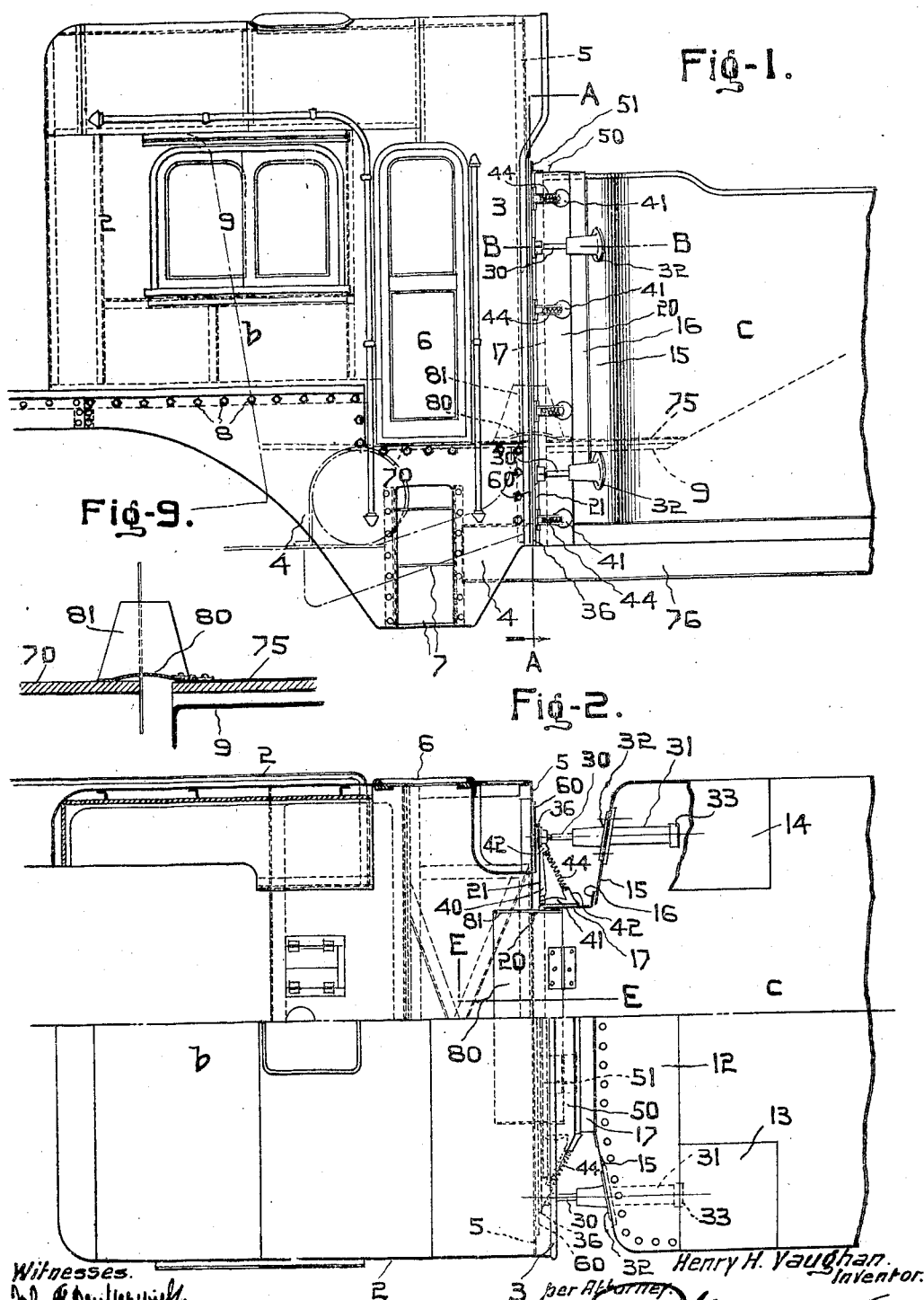

UNITED STATES PATENT OFFICE.

HENRY H. VAUGHAN, OF MONTREAL, QUEBEC, CANADA.

APPLIANCE FOR LOCOMOTIVE CABS AND TENDERS.

1,108,816.  Specification of Letters Patent.  Patented Aug. 25, 1914.

Application filed September 20, 1912. Serial No. 721,444.

*To all whom it may concern:*

Be it known that I, HENRY H. VAUGHAN, of the city of Montreal, Province of Quebec, Dominion of Canada, have invented certain new and useful Improvements in Appliances for Locomotive Cabs and Tenders; and I do hereby declare that the following is a full, clear, and exact description thereof.

My invention relates particularly to the rear of the cab and the coal door opening of the tender, and it has for its object to protect the occupants of the cab from the inclemency of the weather and other disadvantages due to exposure.

To this end the invention may be said briefly to consist of a vestibule combined with particular constructions of the rear end of the cab and front end of the tender.

More specifically speaking, the invention consists of a cab and tender having their rear and front ends, respectively, connected by a vestibule and otherwise completely closed by walls, the wall of the cab being furnished with doors for the use of the engineer and fireman in getting on and off the locomotive; and the invention further consists of the construction, combination and particular arrangement of parts hereinafter described and pointed out in the claims. For full comprehension, however, of my invention reference must be had to the accompanying drawings forming a part of this specification, in which similar reference characters indicate the same parts, and wherein:

Figure 1 is a side elevation of the rear and front ends of a locomotive-cab and tender, respectively, and a vestibule uniting them, all constructed and arranged according to my invention; Fig. 2 is a part plan and part horizontal sectional view; Fig. 3 is a transverse vertical sectional view taken on line A A Fig. 1; Fig. 4 is a detail sectional view taken on line B B Fig. 1 and drawn to a larger scale; Fig. 5 is a detail sectional view taken on line C C Fig. 4; Fig. 6 is a detail vertical sectional view taken on line D D Fig. 3; Fig. 7 is a detail longitudinal vertical sectional view taken on a line bisecting the knuckles of one of the hinges; Fig. 8 is a detail plan view of one of the hinges; and Fig. 9 is a detail transverse sectional view of the floor of the vestibule.

The locomotive-cab is indicated at $b$ and the forward portion of the tender at $c$, each being in the main of any approved construction. The changes I have made in construction, affect the rear of the cab and front of the tender.

According to my invention the sides 2 of the cab are extended rearwardly as at 3 to a point near the vertical plane of the rear end of the roof and downwardly as at 4 to the level to which the steps have extended in locomotive cabs as heretofore constructed, and a rear wall 5 partially closes in rear end of the cab, thus closing in the firing deck. Each side of the cab is provided with a door 6 covering steps 7, and the downward extension 4 at one side consists of a plate bolted in place as at 8, to permit of removal for the purpose of affording access to or permitting displacement of the usual air drum. The sides and rear wall of the cab are provided with glazed windows 90, and such rear wall in conjunction with the side walls form spaces for accommodating a pair of tool boxes at the rear of the steps, and between them and the rear wall. The forward end of the tank frame is made to project forwardly in box-like form 9 and roof plates 12, 13 and 14 cover the extreme forward end of the tender and the portions of the sides immediately adjacent to the forward end; while the front wall 15 is inclined forwardly from the sides toward the middle to afford the required clearance. The inner end of this front wall has the outwardly and laterally flanged rear end 16 of a forwardly projecting extension 17 of inverted U cross-section riveted thereto and straddling the projection 9 of the tank, the latter forming the floor and the extension 17 a portion of the walls and roof of the passage between the tender and cab; such passage being completed by a member in telescopic relation with the member 17, and held yieldingly thereon against relative lateral and endwise displacement, and in this manner maintaining a tight joint with the rear wall 5 of the cab. This yielding telescopic member comprises a pair of wings 20 fitted slidably upon the sides of the inverted U member 17 upon which it bears and by which it is guided in endwise movement and retained against lateral displacement. A pair of vertical diaphragms 21 are carried at each side of this member 17 and have the wings hinged thereto. The purpose of these diaphragms is to bear through suitable rubbing plates upon the rear wall of the cab and in order to cause them to make a good joint and follow the deflections of such rear wall from position at right angles to the member 17, a series of plungers 30, a pair at each side are connected to and support the diaphragm and are guided in sleeves 31 flanged as at 32 near their forward ends through which they are secured to the front plate 15 of the tender, the main length of the sleeves projecting through the plates into the coal space and being closed by caps 33. The plungers are reduced in diameter near their rear ends and screw-threaded to receive collars 34 between which and the caps 33, helical springs 35 bear and yieldingly maintain the plungers and with them the diaphragms in forward position. These diaphragms are riveted to and support a rubbing plate 36 in the form of an inverted U with a cross-bar 37 extending across the front of the tank projection 9. In order to obtain an effective joint between the wings 20 and walls 17 the leaves 40 and 41, respectively, of the hinges are formed with sockets 42 in which rods 43 are set for guiding and retaining helical springs 44; and the lateral relative displacement between the wings and diaphragms is accommodated by slots 48 in the hinge members 41 within which the pintles 49 are free to have restricted horizontal movement.

The joint between the top of the member 17 and the rubbing plate 36 is effected by an overhanging flange or plate 50 rigidly secured to the rubbing plate by an angle-iron 51 riveted to both. The rubbing plate bears upon a second rubbing plate 60 of similar contour but greater width and riveted to the rear wall 5 of the cab.

The cab floor and coal deck are indicated at 70 and 75 respectively and the tender frame at 76.

A plate 80 with its ends turned up as at 81 and its rear side edge hinged to the coal deck rests upon the cab floor and serves as an apron.

This construction presents a vestibule connection between the locomotive cab and tender which affords ample protection for the crew of the locomotive and at the same time facilitates firing, while its width is reduced to approximately three fifths the width of the coupled ends of the cab and tender for the purpose of facilitating the turning of curves.

Operation: Before the tender and locomotive are coupled, the diaphragms or rubbing plate upon the tender tend to lean forward under the pressure of springs 35 and 44, and when the tender is coupled to the locomotive in the usual way, the springs are compressed and the rubbing plates 36, 37 and wing 20 and extension 17 bear tightly one upon the other and effectively exclude the elements from the firing deck.

What I claim is as follows:—

1. A locomotive cab having an extension at its rear end, such extension having side doors for ingress and egress to and from the cab, and a vestibule structure forming a passageway between the cab and a tender.

2. The combination with the rear end of a locomotive cab and the forward end of a tender, one side of the cab having a door for ingress and egress to and from the cab, of a rubbing plate rigidly secured upon the cab; a second rubbing plate; means carried by the tender for supporting the said last mentioned rubbing plate and causing the same to bear upon the first mentioned rubbing plate; and telescopic means constructed to present a relatively narrow inclosed passageway between the tender and locomotive.

3. A locomotive cab having a rearward extension for connection with a tender and the cab $b$ having a side door therein.

4. A locomotive cab having a rearward extension for connection with a tender and a cab having a side door therein and steps within the extension.

5. A locomotive cab having a rearward extension with side doors therein, steps within the extension, the said extension being arranged to accommodate tool boxes within the cab at the rear of the steps.

6. In a vestibule connection between two pieces of rolling stock, a pair of rubbing plates carried by said pieces of rolling stock, means rigidly securing one rubbing plate to one of said pieces of rolling stock, and means yieldingly supporting the other rubbing plate relatively to the first mentioned plate.

7. A vestibule forming a passageway between two pieces of rolling stock comprising a pair of rubbing plates carried by said pieces of rolling stock and consisting of a member of inverted U-form secured to one of said pieces and a second member of inverted U-form secured to the other of said pieces such second member surrounding the first mentioned member and being slidably supported by the same for the purpose of forming a passageway between the two pieces of rolling stock.

8. A vestibule forming a passageway between two pieces of rolling stock comprising a pair of rubbing plates carried by said pieces of rolling stock and consisting of a member of inverted U-form secured to one of said pieces and a second member of inverted U-form secured to the other of said pieces such second member surrounding the first mentioned member for the purpose of forming a passageway between the two pieces of rolling stock.

9. The combination with a locomotive cab and tender, of a pair of diaphragms located at opposite sides of and within the space between the cab and tender; yielding supports upon the tender for the diaphragms; means forming a relatively narrow passageway from the tender toward the cab; wings carried by the diaphragms and forming a yielding projection of the passageway; and means carried by the diaphragm and overhanging the forward end of the passageway.

10. The combination with a locomotive cab and tender, of a series of plungers at each side of and carried by the tender, a diaphragm plate of inverted U form supported by the plungers, a series of springs retaining the plungers in their forward position; means forming a relatively narrow passageway extending from the tender toward the cab; wings mounted upon the diaphragm plate and forming a projection of the passageway; and means carried by the diaphragm plate and overhanging the forward end of the passageway.

11. The combination with a locomotive cab and tender, of a series of plungers mounted at each side of the tender; a diaphragm plate of inverted U form supported by the plungers; means forming a passageway extending from the tender toward the cab; wings hinged to the diaphragm plate; a series of springs separating the members of the hinges; means carried by the diaphragm plate and overhanging the forward end of the passageway.

12. The combination with a locomotive cab and tender, of a series of plungers mounted at each side of the tender; a diaphragm plate of inverted U form supported by the plungers; means forming a passageway extending from the tender toward the cab; wings hinged to the diaphragm plate; a series of springs separating the members of the hinges; a flanged plate riveted to the diaphragm plate and overhanging the forward end of the passageway.

13. The combination with a locomotive cab and tender, of a series of plungers mounted at each side of the tender; a diaphragm plate of inverted U form supported by the plungers; means forming a passageway extending from the tender toward the cab; an apron within the passageway and covering the joint between the forward end of the floor of the said passageway and the cab; wings hinged to the diaphragm plate; a series of springs separating the members of the hinges; and means carried by the diaphragm plate and overhanging the forward end of the passageway.

14. The combination with a locomotive cab and tender, of a series of plungers mounted at each side of the tender, a diaphragm plate of inverted U form supported by the plungers; means forming a passageway extending from the tender toward the cab; an apron within the passageway and covering the joint between the forward end of the floor of the said passageway and the cab; wings hinged to the diaphragm plate; a series of springs separating the members of the hinges; a flanged plate riveted to the diaphragm plate and overhanging the forward end of the passageway.

15. A vestibule appliance between two pieces of rolling stock, comprising a pair of diaphragms located at opposite sides of and within the space between the pieces of rolling stock; yielding supports upon one of the pieces of said rolling stock for the diaphragms; means forming a relatively narrow passageway from one to the other of the said pieces of rolling stock; wings carried by the diaphragms and forming a yielding projection of the passageway; and means carried by the diaphragm and overhanging the forward end of the passageway.

16. A vestibule appliance between two pieces of rolling stock, comprising a series of plungers at each side of and carried by one of the pieces of rolling stock, a diaphragm plate of inverted U-form supported by the plungers, a series of springs retaining the plungers in their forward position; means forming a relatively narrow passageway extending from one piece of rolling stock to the other; wings mounted upon the diaphragm plate and forming a projection of the passageway, and means carried by the diaphragm plate and overhanging the forward end of the passageway.

17. A vestibule appliance between two pieces of rolling stock, comprising a series of plungers mounted at each side of one of the pieces of rolling stock, a diaphragm plate of inverted U-form supported by the plungers, means forming a passageway extending from one of the pieces of rolling stock to the other; wings hinged to the diaphragm plate; a series of springs separating the members of the hinges, means carried by the diaphragm plate and overhanging the forward end of the passageway.

18. A vestibule appliance between two pieces of rolling stock, comprising a series of plungers at each side of one of the pieces of rolling stock; a diaphragm plate of inverted U-form supported by the plungers; means forming a passageway extending from one piece of rolling stock to the other; wings hinged to the diaphragm plate; a series of springs separating the members of the hinges; a flanged plate hinged to the diaphragm plate and overhanging the forward end of the passageway.

19. A vestibule appliance between two pieces of rolling stock, comprising a series of plungers mounted on each side of and carried by one piece of rolling stock; a diaphragm plate of inverted U-form supported by the plungers, a series of springs retaining the plungers in their forward position, means forming a passageway from one piece of rolling stock to the other; an apron within the passageway covering the joints in the forward end of such passageway and one of the pieces of rolling stock, wings mounted upon the diaphragm plate and forming a projection of the passageway; and means carried by the diaphragm plate and overhanging the forward end of the passageway.

20. A vestibule appliance between two pieces of rolling stock, comprising a series of plungers one at each side of one of the pieces of rolling stock, a diaphragm plate of inverted U-form supported by the plungers, means forming a passageway extending from one of the pieces of rolling stock to the other; an apron within the passageway covering a joint within the floor from one end of the passageway and one of the pieces of rolling stock; wings hinged to the diaphragm plate, a series of springs separating the members of the hinges; and means carried by the diaphragm plate and overhanging the forward end of the passageway.

21. A vestibule appliance between two pieces of rolling stock, comprising a series of plungers at each side of one of the pieces of rolling stock, a diaphragm plate of inverted U-form supported by the plungers; means forming a passageway extending from one of the pieces of rolling stock to the other; an apron within the passageway covering the joint at the forward end of the said passageway and one of the pieces of rolling stock; wings hinged to the diaphragm plate; a series of springs separating the members of the hinges; a flanged plate riveted to the diaphragm plate and overhanging the forward end of the passageway.

In testimony whereof I have signed my name to this specification in the presence of two witnesses.

Montreal, September 3, 1912.

HENRY H. VAUGHAN.

Witnesses:
E. R. PITTS,
GORDON G. COOKE.